United States Patent

[11] 3,564,220

[72] Inventors John G. Peddie;
Carl F. Reuter, San Antonio, Tex.

[21] Appl. No. 765,942
[22] Filed Oct. 8, 1968
[45] Patented Feb. 16, 1971

[73] Assignee H. Dell Foster Co.
San Antonio, Tex.

[54] DIGITAL SCALE CHANGING
6 Claims, 16 Drawing Figs.

[52] U.S. Cl. .......... 235/92, 307/225, 328/41
[51] Int. Cl. .......... H03k 21/00
[50] Field of Search .......... 235/92, 24, 29, 31, 34, 53, 57, 63, 64, 66; 340/347; 307/222, 225; 328/44, 41, 48

[56] References Cited

UNITED STATES PATENTS

| | | | |
|---|---|---|---|
| 2,850,240 | 9/1958 | Dickinson | 235/92 |
| 3,449,742 | 6/1969 | Stapleton | 340/347 |
| 2,990,541 | 6/1961 | Gill | 340/179 |
| 3,230,353 | 1/1966 | Greene et al. | 235/159 |
| 3,260,839 | 7/1966 | Brown | 235/92 |
| 3,290,492 | 12/1966 | Hallmark | 235/151.11 |
| 3,337,722 | 8/1967 | Siess et al. | 235/92 |
| 3,447,149 | 5/1969 | Groth | 340/347 |

OTHER REFERENCES

Applicant's Non-Pat. citations "Logic for Visual Displays"; Polinsky and McCall; Reprinted from Feb. 1967 issue of Electro-Technology "Frequency IC Preset Eput Meter" Beckman Electronic Instrumentation Catalog 1967/1968

*Primary Examiner*—Maynard R. Wilbur
*Assistant Examiner*—Joseph M. Thesz, Jr.
*Attorney*—Watson, Cole, Grindle & Watson

ABSTRACT: A digital scale factor changing apparatus includes a number of individually preset counter mechanisms for inserting a desired scale factor alteration in a digital clock signal wherein the overflow or carry signals from the individual preset counters are accumulated as the desired scale factor output.

INVENTORS

JOHN G. PEDDIE
CARL F. REUTER

BY Watson, Cole, Grindle & Watson
ATTORNEYS

INVENTORS
JOHN G. PEDDIE
CARL F. REUTER

BY Watson, Cole, Grindle & Watson
ATTORNEYS

INVENTORS,
JOHN G. PEDDIE
CARL F. REUTER
BY Watson, Cole, Grindle & Watson
ATTORNEYS

INVENTORS
JOHN G. PEDDIE
CARL F. REUTER

BY Watson, Cole, Grindle & Watson
ATTORNEYS

INVENTORS
JOHN G. PEDDIE
CARL F. REUTER

BY Watson, Cole, Grindle & Watson
ATTORNEYS

INVENTORS
JOHN G. PEDDIE
CARL F. REUTER
BY Watson, Cole, Grindle & Watson
ATTORNEYS

INVENTORS
JOHN G. PEDDIE
CARL F. REUTER

BY Watson, Cole, Grindle & Watson
ATTORNEYS

INVENTORS
JOHN G. PEDDIE
CARL F. REUTER
BY Watson, Cole, Grindle & Watson
ATTORNEYS INVENTORS
JOHN G. PEDDIE
CARL F. REUTER
BY Watson, Cole, Grindle & Watson
ATTORNEYS

DIGITAL SCALE CHANGING

This invention relates to digital processing of photogrammetric and related graphic material. More particularly, the invention is concerned with scale changing in photogrammetric processing systems such as digital planimeters.

In the measurement of directed line segments and areas on aerial photographs it frequently is necessary to adjust the dimensional scale values to match adjoining photographs or overlaying graphic material. For example, in superpositioning of several photographs, or of a photograph and a map, careful adjustment of the scaled values is required. In processing even a single photograph or map it is desirable to be able to apply a scale coefficient which will yield output data in the proper dimensional units. Much effort has been applied in the prior art to solution of such problems, but in general the procedures have consisted of visual and manual adjustments by a skilled operator.

The method and means of the present invention are intended to provide more nearly automatic scale changing in the scanning and matching of directed lines or planimetric segments. It is an object of this invention to provide a method of adjusting scaled values in the digital processing of photogrammetric and graphic material. A further object is to provide a scale changing method in which a multiplicity of preset counters are operated simultaneously to provide maximum speed in transfer of a multidigit conversion factor. Another object is to provide a digital scaler arrangement in which parallel operation of preset counters, including parallel storage of the carry signal, is utilized to achieve high-speed processing. Still another object is to provide scale-corrected information to a quantizer-accumulator by use of paralleled preset counters in conjunction with scaler up/down counters.

In a previous application, 673,577, filed Oct. 9, 1967, John G. Peddie has described a digital planimeter for the measurement of areas on photographs or related graphic material. To simplify the present disclosure, and by way of example, our digital scale changing invention will be described with particular reference to the above-mentioned digital planimeter, it being understood that various other applications are possible in the digitizing of graphic information.

In the appended drawings of the present invention:

Figure 1:
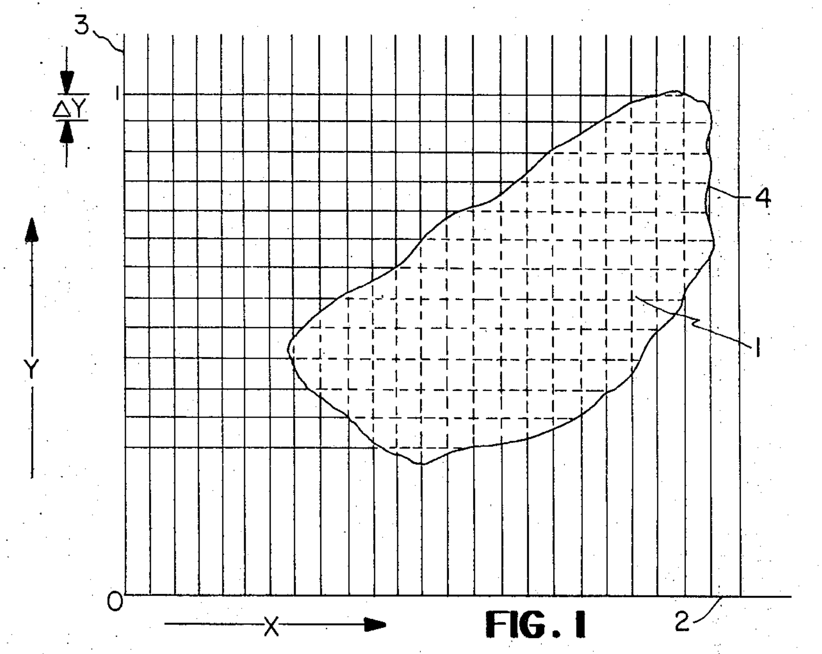
FIG. 1 is a graphic illustration of a typical photogrammetric feature superposed on a set of rectangular coordinates.

Referring to FIG. 1 of the drawing, there is shown a bounded area 1, having a perimeter 4, which is superposed on $x$ and $y$ graphical coordinates drawn with reference to zero lines 2 and 3. Each point on perimeter 4 may be located and defined by values of $x$ and $y$. For digital planimetric measurements, it is preferred to move the measuring point through uniform incremental values of $y$, such as $\Delta y$, and to determine the associated change in $x$. By summation of all of the incremental movements along the perimeter 4, the total area of bounded area 1 can be determined in terms of the scale values assigned to $x$ and $y$ increments. If bounded area 1 is photographed or drawn to a scale other than that of the $x$ and $y$ measuring system, a suitable conversion or change in scale must be applied.

Figure 2:
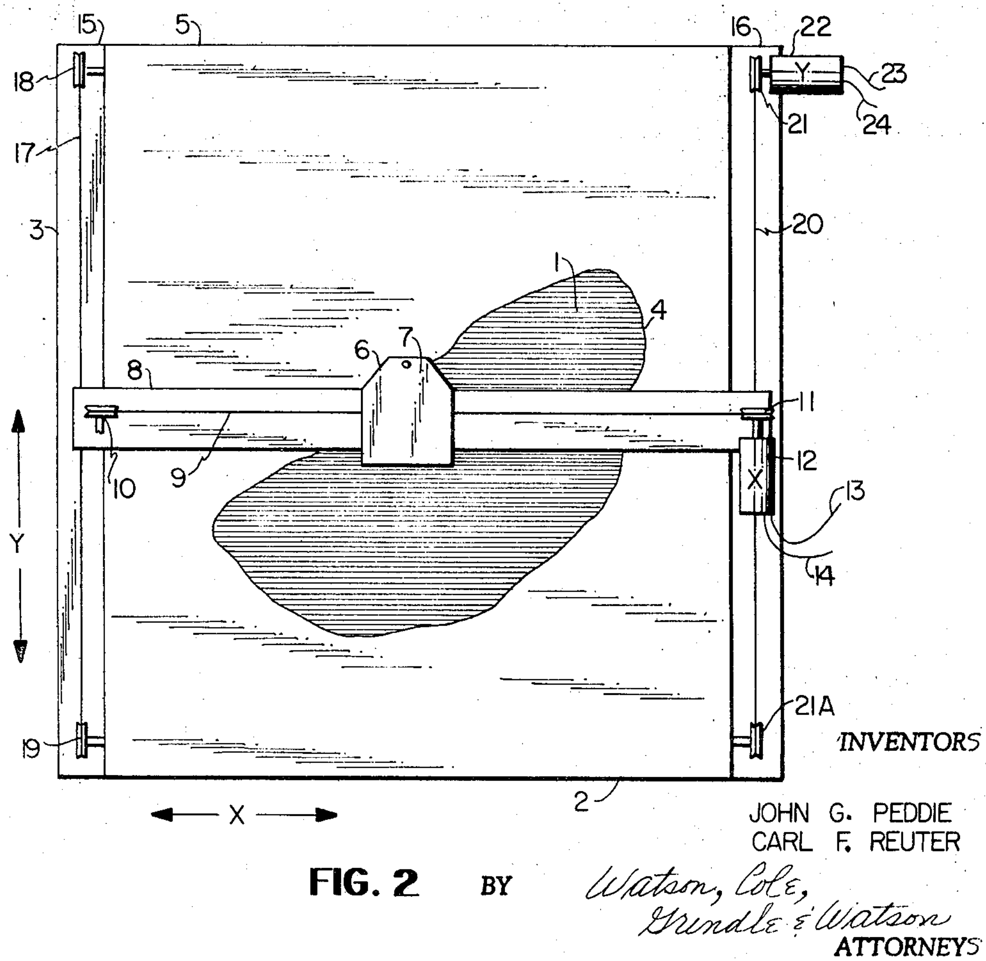
FIG. 2 is a schematic representation of a digital planimeter apparatus used in processing photogrammetric information such as shown in FIG. 1.

As shown in the previously-mentioned application, U.S. Ser. No. 673,577 the photograph, map or other graphic material containing the bounded area 1 may be mounted on a scanning frame 5, as seen in FIG. 2, which is fitted with a movable cursor 6 which can be moved to any position represented by $x$ and $y$ coordinates as referenced to zero lines 2 and 3. A reticule 7 is provided on cursor 6 to permit close control in tracing out the perimeter 4. The entire assembly of cursor 4 is arranged to slide smoothly along horizontal arm 8 and thus transmit its motion to $x$-encoder 12 by way of cable 9 moving around pulleys 10 and 11. Horizontal arm 8 in turn is mounted so as to move accurately in the vertical or "$y$" direction along guides 15 and 16, and to simultaneously actuate $y$- encoder 22 by way of cable 20 which moves on associated pulleys 21 and 21*A*. A similar cable 17 and associated pulleys 18 and 19 are provided on guide 15 so as to result in a balanced and smooth motion of horizontal arm 8.

In measuring the bounded area 1, the operator manually moves cursor 6 carefully along the perimeter 4 as viewed in reticule 7. The motions of cursor 6 are transmitted to the shafts of $x$-encoder 12 and $y$-encoder 22 which then generate position signals suitable for digital processing and automatic computation of the bounded area 1.

Referring again to FIG. 2, perimeter 4 is seen to be defined by $x$ and $y$ coordinates referred to the origin (0,0) at the intersection of zero lines 2 and 3. Thus if cursor 6 is placed on a $y$-coordinate, the associated $x$-coordinate or "$x$-scaler" value may be read. As cursor 6 is caused to traverse perimeter 4, it may be assumed that a halt is made at uniform increments of $y$, such as $y_1$, $y_2$ ----$y_n$, representing command steps. The associated $x$-scaler value is then read at each halt. In effect, the $x$-scaler values obtained at two intercept points, such as $x_1$ and $x_2$, will furnish the incremental distance $(x_1-x_2)$ which when multiplied by the command increment $\Delta y$ will yield the small incremental area $\Delta A = \Delta y(x_1-x)$.

Since all of the $y$ increments, or command steps, are equal, the order in which the $x$-scaler values are determined is immaterial in the final summation. The absolute values of $x_1$, $x_2$----$x_n$ can be used, therefore, in a defining algorithm if some means is provided for determining when cursor 6 is moving away from or toward the $x$-axis. Thus, if $y$ is chosen as the command coordinate so as to determine the measuring increment, then the $x$-scaler value can be defined as positive when $y$ is moving away from the $x$-axis and negative when $y$ moves toward the $x$-axis. More simply, $x$ can be defined as positive when the $y$ command value is increasing and negative when it is decreasing in value.

Using these definitions, an algorithm may be written to show the necessary operational steps:

$$A = h[(x_1)_{y_1} - (x_2)_{y_1} + (x_3)_{y_2} - (x_4)_{y_2} \ldots \pm (x_m)_{y_n} \mp (x_{m-1})_{y_n}]$$

where $A$=total area to be measured $h$=$\Delta y$=increment of $y$, the command coordinate.

Thus when all values of the $y$ command coordinate have been traversed and the $x$-scaler values recorded, the total area may be determined by substitution in the algorithm. Proper sign for each scaler value may be determined by noting the direction in which the $y$ command has changed since the last halt. The total area is then obtained by summing algebraically all the values of the $x$-scaler and multiplying this sum by the actual incremental value of $y$. This computational operation is indicated in the basic flow chart of FIG. 3.

As described in the forementioned application U.S. Ser. No. 673,577, the digital planimeter invention provides an automatic digital solution of the area algorithm. Inasmuch as the circuitry of the planimeter is a matter of record, it is not believed necessary to repeat the description of its operation here, except insofar as the scale-changing aspects of the present invention are concerned.

Figure 4:
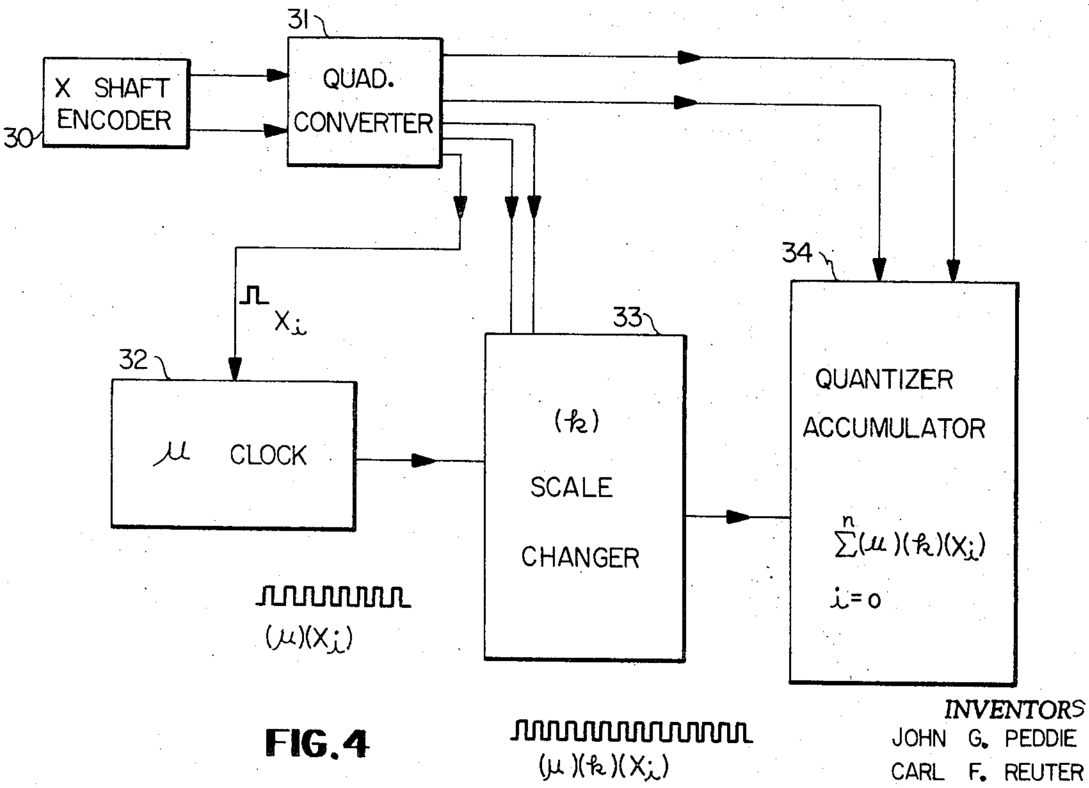
FIG. 4 is a simplified block diagram showing the basic arrangement of the present digital scale changing invention which may be applied in processing electrical data obtained as output from the apparatus of FIG. 2.

The general arrangement of our digital scale-changing invention is shown in the simplified block diagram of FIG. 4. Motion of $x$-shaft encoder 30 results in out-of-phase square wave signals which are converted into encoder pulses $x_i$ and up/down control signals by quadrature converter 31. The encoder pulses $x_i$ are utilized to turn on or gate a $u$-clock 32 which then delivers $u$ output pulses; for example, it is convenient that $u$=10. The output of $u$-clock 32 then is $(u)\ (x_i)$, where $x_i$ simply identifies the particular $x$-encoder pulse. This train of output pulses from $u$-clock 32 is then applied to the quantizer-accumulator 34 by way of scale-changing circuitry 33, which represents the basic part of the present invention.

Figure 3:
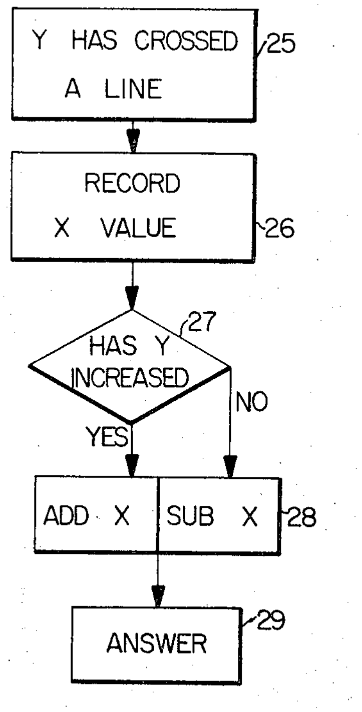
FIG. 3 is a defining algorithm together with a logic flow chart showing the required computational operations.

In the previous invention the $u$-clock pulses were applied directly to quantizer-accumulator 34 where, under control of the up/down signals from quadrature converter 31, their summation was accomplished in accordance with the algorithm expression in FIG. 3. In the present invention, however, the output pulses from $u$-clock 32 are applied first to the scale changing circuitry 33 where, under the control of preset counters and CW/CCW signals from quadrature converter 31, they are multiplied by a predetermined scale coefficient so as to fit or merge into measurements on associated photographs or graphic material.

Figure 4A:
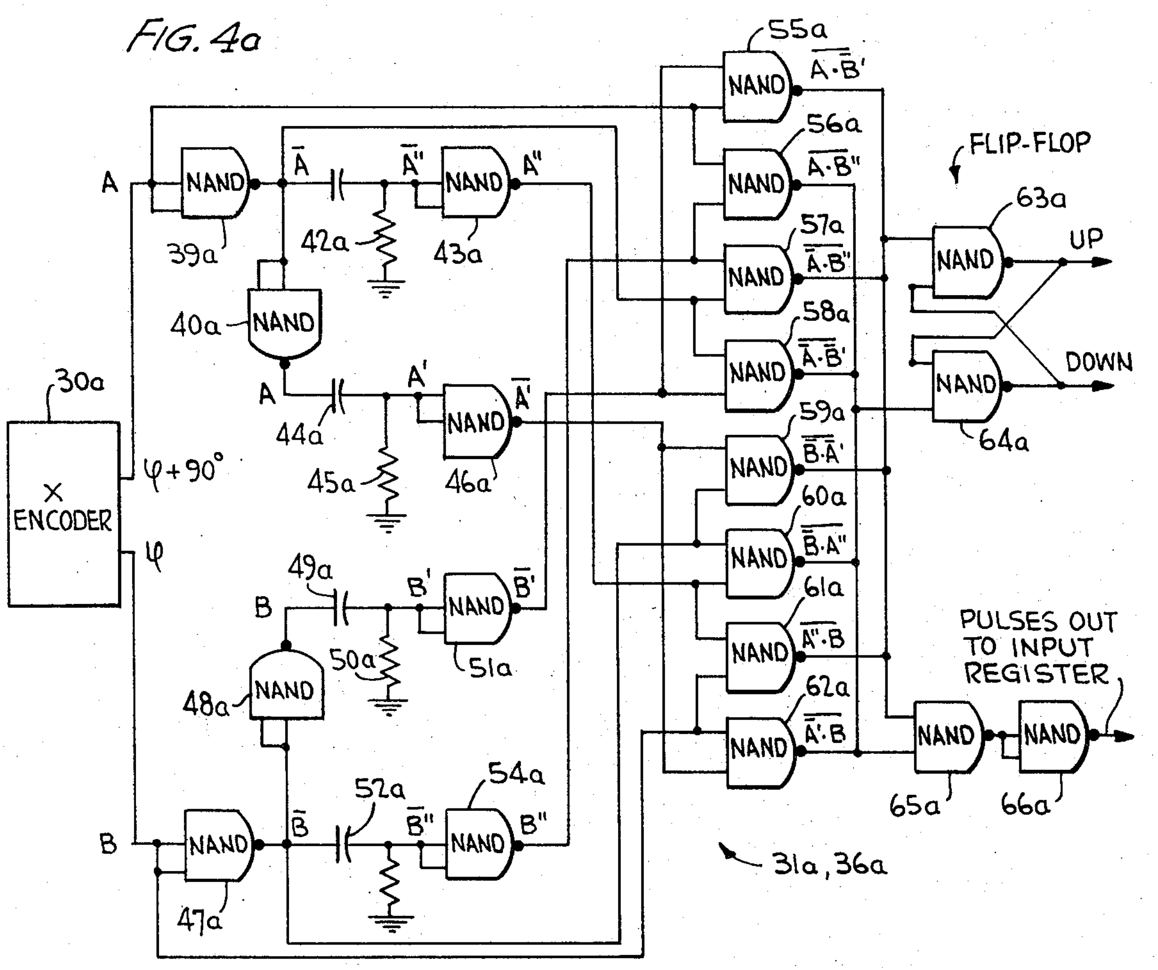
FIG. 4A illustrates the detailed implementation of the quadrature converter circuitry.
Figure 4B:
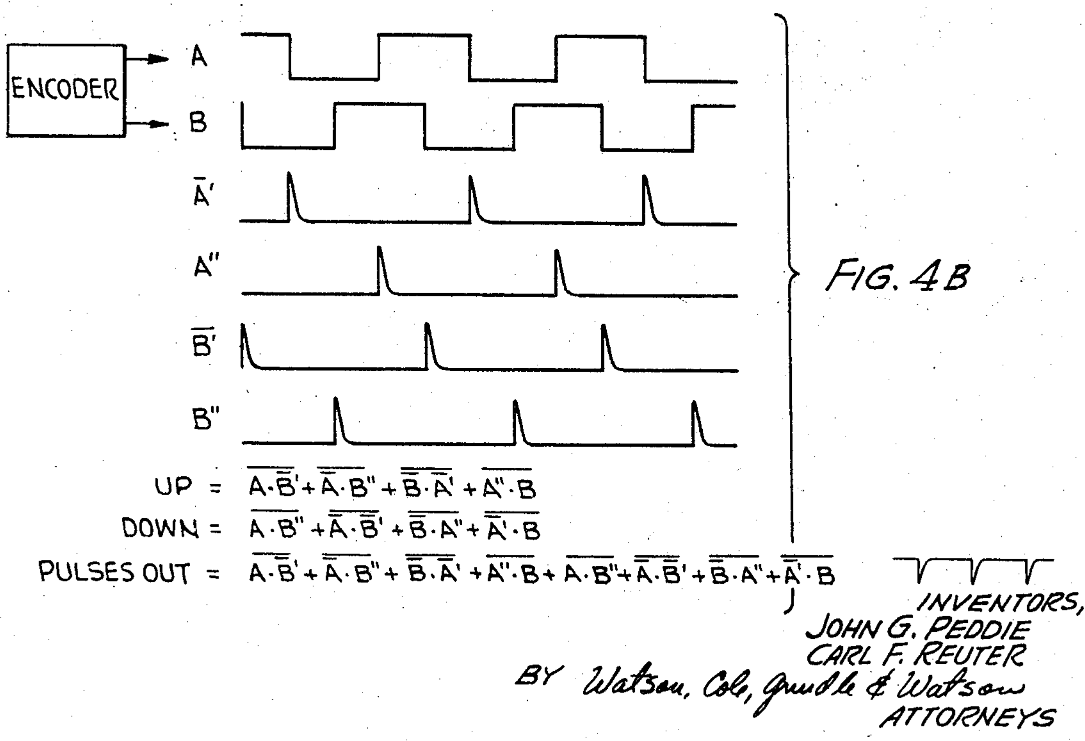
FIG. 4B shows typical signal waveforms in quadrature converter circuitry.

Quadrature converter 31 is described in the aforementioned application Ser. No. 673,577 as follows. An embodiment of the circuitry comprising quadrature converters 31 or 36 is shown in FIG. 4A. The operation of the converter will be more easily understood with reference to the signal waveform shown in FIG. 4B. Quadrature converter 31 or 36 is comprised entirely of NAND gate circuit elements, inverter circuits using a NAND gate circuit configuration, and capacitor-resistor networks which serve to provide the necessary differentiated pulses. The NAND circuit configuration is for convenience only, since most of the logic elements of the digital planimeter are comprised of such NAND gate elements. Those skilled in the art will recognize that other logic circuitry may also be substituted for that shown in FIG. 4A to perform the necessary functions of the quadrature converter circuitry. The two series of output signals from $x$-encoder 30, 35 are out of phase by 90° as indicated by signal waveforms A and B in FIG. 4B. Output signals A and B are provided to inverter gates 39a and 47a, respectively, (which are NAND gate elements having their inputs paralleled to perform an inverter function). The inverted outputs $\overline{A}$ and $\overline{B}$ are respectively applied to capacitor-resistor networks 41a, 42a and 52a, 53a to form the indicated output $\overline{A''}$ and $\overline{B''}$. These signals are respectively inverted by inverter circuits 43a and 54a to provide signals A'' and B'' which are shown in FIG. 4B in relation to encoder output signals A and B. Simultaneously, the respective outputs from inverter circuits 39a, 47a are provided through inverter circuits 40a, 48a respectively, and then to capacitor-resistor networks 44a, 45a and 49a, 50a, respectively, to provide the indicated outputs A' and B'. The signals A' and B' are then each inverted, respectively, by inverter circuits 46a and 51a to form the indicated outputs $\overline{A'}$ and $\overline{B'}$ which are also shown in FIG. 4B. The signals A'', $\overline{A'}$, $\overline{B'}$ and B'', along with the signals $\overline{A}$ and $\overline{B}$ are provided to NAND gate circuits 55a—62a in the indicated manner so as to be combined to provide the logic signals appearing at the output of NAND gate circuits 55a—62a. These outputs are then combined according to the logic equations at the bottom of FIG. 4B in NAND gate elements 63a and 64a to form the necessary UP, DOWN control signals for a register which is not shown. The pulse output from the $x$-converter, which is indicative of the movement of the cursor in the $x$-direction, is formed through NAND gate 65a and inverter 66a in accordance with the logical equation appearing at the bottom of FIG. 4B. The UP, DOWN and pulse output signals of the $x$-converter provide the necessary control signals to properly operate the aforementioned register so as to provide therein an instantaneous accumulation of information which represents the movement of cursor 6 the $x$-direction.

The $y$-encoder circuitry is similar to that of the $x$-encoder circuitry just described except that the pulse output signal from the $y$-converter is altered such that each pulse output represents a traversal of one unit of the cursor in the $y$ coordinate direction. Thus, the $y$ quadrature converter circuitry may include a counter or divider network such that each pulse output represents one unit of travel of the cursor in the $y$ coordinate direction.

For example, superposition of a highway map with a scale of 1 inch =2,640 feet on an aerial photograph with scale 1 inch =2,000 feet would require a scale adjustment which could be accomplished by the present invention. Similarly, it might be desirable to merge or accurately fit adjacent segments of an overall aerial survey in which the scale varies somewhat. Basically, the invention can be used in photogrammetric or similar data processing where ever it is desirable to correct for differences in the dimensional scales.

In the simplified arrangement of FIG. 4, the $(u)\ (x_i)$ output from $u$-clock 32, as controlled by the motion of $x$-encoder 30, is multiplied by the preset coefficient $k$ in scale changer 33 so as to result in $(u)\ (x_i)\ (k)$ digits, introduced into the quantizer-accumulator 34, for each encoder pulse from $x$-shaft encoder 31. At any particular instant the output reading on quantizer-accumulator 34 will be the summation of the series of $x_i$ pulses multiplied by the $u$ factor of $u$-clock 32 and the scale coefficient $k$ preset in scale changer 33. The instantaneous summation may be expressed as:

$$\sum_{i=0}^{n} (u)(k)(x_i)$$

where $x_i$ simply expresses the order of the $x$-scaler values with the ±sign determined by the associated up/down signal;

$u$ =number of clock pulses per encoder pulse; and $k$ =preset multiplier coefficient or scale factor.

While the arrangement described above is quite operable and useful, this basic technique requires that the circuitry of scale changer 33 and quantizer-accumulator 34 be at least 10 times faster than the fastest rate of encoder 30 to permit a range of 0 to 9 in the $k$ coefficient. Similarly, the $u$-clock 32 must run at this higher rate. If a coefficient range of a number of decades is desired, for example from 0 to 999, it is obvious that this serial method of operation has limitations.

Figure 5:
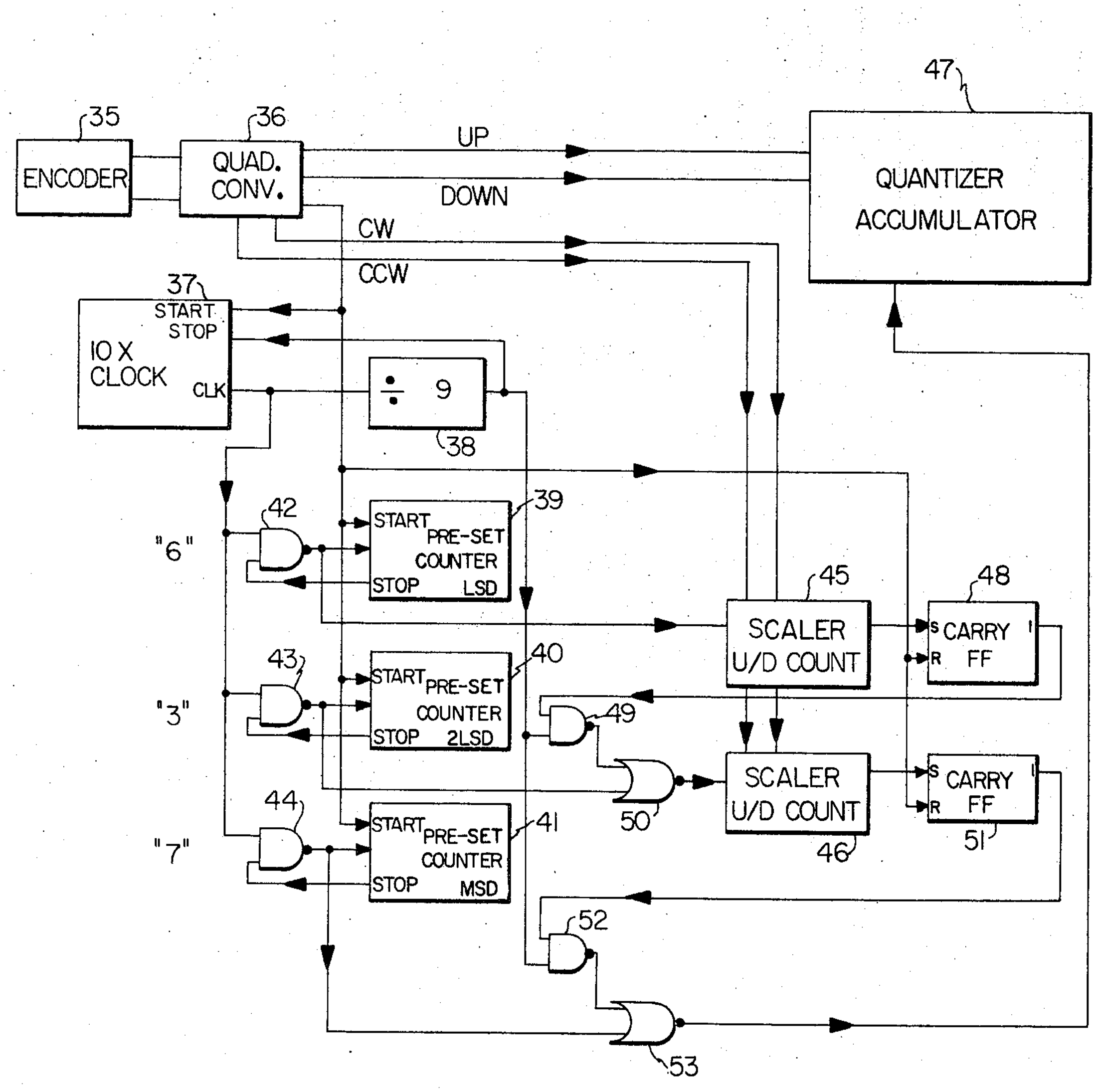
FIG. 5 is a logic diagram illustrating one possible arrangement of the circuitry in the digital scale changing apparatus.

Accordingly, our invention contemplates use of a parallel type of scale changing operation in which the circuit speed requirements are minimized. Referring to FIG. 5, a 10$x$ clock 37 is arranged to have a frequency equivalent to 10 times the response of $x$-encoder 35. The clock output from 10$x$ clock 37 is applied simultaneously to three preset counters 39, 40 and 41. Preset counter 39, for example, is a unidirectional counter whose input comes via control gate 42 which is, in turn, controlled by the counted output from preset counter 39 itself, via an internal detection gate which will be described shortly. Associated with each preset counter stage, such as 39, is a scaler up/down counter 45 which, under sign control of CW/CCW signals from quadrature converter 36, sums the clock pulses received via control gate 42. Output from the typical scaler up/down counter 45 is a carry signal which is applied via carry flip-flop 48 and combined logically with the input to the next scaler up/down counter 46. The signal output from the last or "most significant digit" preset counter 41 is applied, as OR'ed with the possible carry from scaler up/down counter 46 in OR gate 53, to the "least significant digit" stage in quantizer-accumulator 47.

It will be noted that the divide-by-nine circuit 38 operates from the output of 10*x* clock 37 and delivers a control signal pulse for every 10 clock pulses, so as to stop the train of clock pulses delivered for each input pulse from *x*-encoder 35, as well as to effect the necessary logic conditions for the carry outputs from scaler up/down counters 45 and 46, via carry gates 49 and 52. The "start" inputs of preset counters 39, 40 and 41 are connected in parallel so that simultaneous operation occurs upon application of the encoder pulse from quadrature converter 36.

Leaving a detailed description of the various logic components until later, the operation of the basic system is as follows:

Each preset counter 39, 40 and 41 can be set manually, by way of selecter switches, so as to accept only a chosen number of input pulses (0 to 9), after which the output recognition gate of the particular counter disables the input control gate 42, 43 or 44 respectively. The use of three preset counters permits setting of a three decade scale factor or *k* coefficient as represented by a Least Significant Digit (LSD), 2nd Least Significant Digit (2ndLSD), and Most Significant Digit (MSD).

By way of concrete example, the use of the coefficient 736 will be described. The LSD preset counter 39 is set to count only six pulses from 10*x* clock 37; the 2nd LSD preset counter 40 is set to count three pulses; and MSD preset counter 41 is set to seven. System counting starts when encoder 35 makes one transition which is converted by quadrature converter 36 so as to furnish an encoder pulse which resets preset counters 39, 40, and 41 to zero. For zero output conditions, the output recognition gate in each preset counter (which will be described later) is not satisfied so that input control gates 42, 43, and 44 are enabled, allowing clock pulses to pass. LSD preset counter 39 allows six clock pulses to pass, both to the counter input and to the associated scaler up/down counter 45. Similarly, at the end of the first counting interval, with only one encoder pulse having been generated, 2ndLSD preset counter 40 has allowed three clock pulses to pass to the associated scaler up/down counter 46, and MSD preset counter 41 has gated seven clock pulses through to its associated "counter" which is the Least Significant Digit stage of quantizer-accumulator 47. The coefficient *k* =736 now is stored in scaler up/down counters 45 and 46 and in the LSD stage of quantizer-accumulator 47. The system now is quiescent until the next transition in encoder 35.

When the next encoder pulse is received from quadrature converter 36, the entire operation of the preset counters is repeated, with the addition of the carry outputs which are generated by scaler up/down counters 45 and 46 so as to set their respective carry flip-flops 48 and 51. At the ninth clock pulse, the following count conditions exist:

LSD preset counter 39 =6
2ndLSD preset counter 40 =3
MSD preset counter 41 =7
LSD scaler up/down ctr. 45 =2
2ndLSD scaler up/down ctr. 46 =6
2nd LSD scaler up/down
MSD scaler up/down ctr. 47 =4
(LSD of quantizer)
LSD carry flip-flop 48 =1
2nd LSD carry flip-flop 51 =0

When the 10th clock pulse from 10 *x* clock 37 is generated, the outputs of carry flip-flops 48 and 51 are OR'd to the inputs of the next stage scaler up/down counters. For example, the carry output from carry flip-flop 48 is applied to gate 49 which simultaneously receives a pulse from 10 *x* clock 37 and its divide-by-nine circuit 38. As a result the 10th clock pulse passes through OR gate 50 to the next or 2nd LSD scaler up/down counter 46. An output from scaler up/down counters 45 and 46 is therefore provided every 10th clock pulse. At the end of the 10th clock pulse, the following count conditions exist:

LSD preset counter 39 = 6
2nd LSD preset counter 40 = 3
MSD preset counter 41 = 7
LSD scaler up/down ctr. 45 = 2
2nd LSD scaler up/down ctr. 46 = 7 (carry added)
MSD scaler up/down ctr. 47 = 4
(LSD of quantizer)
LSD carry flip-flop 48 = 1
2nd LSD carry flip-flop 51 = 0

Figure 5A:
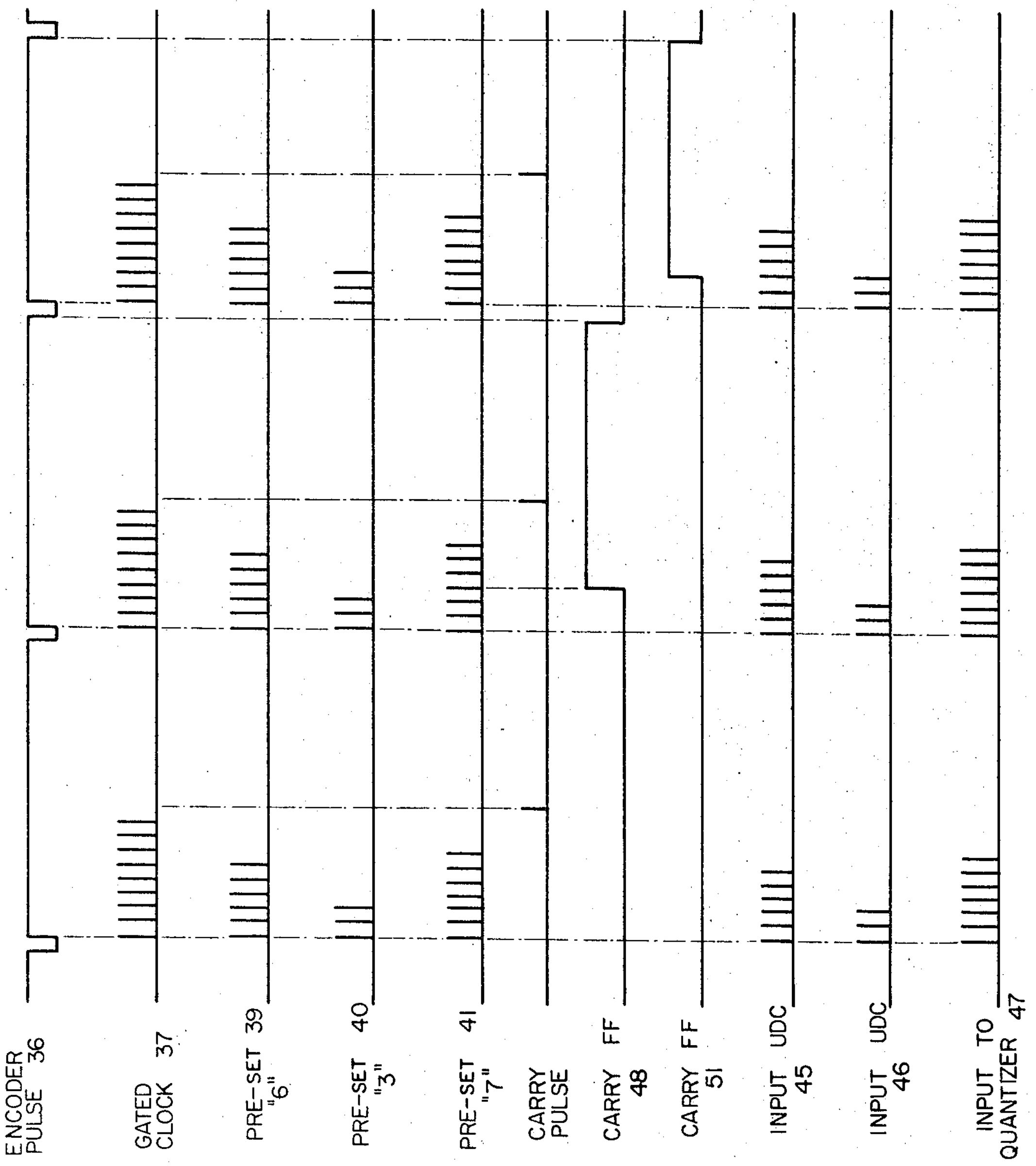
FIG. 5A is a timing diagram relating to the functioning of the scale changing circuitry of FIG. 5.

Briefly, the operation was: (1) encoder pulse occured; (2) scale coefficient 736 was stored in scaler up/down counters; and (3) scale coefficient 736 was added to the scaler up/down counters. In other words, each time an encoder pulse occurs the preselected multiplier coefficient is added to the scaler up/down counters 45 and 46 with an eventual carry output to quantizer-accumulator 47. Functioning of the logic circuitry of FIG. 5 can be understood more clearly by reference to the timing diagram of FIG. 5A which shows the logic sequence for several complete cycles.

Figure 6:
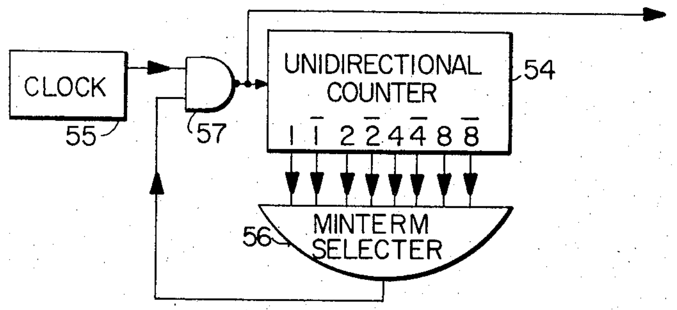
FIG. 6 is a logic diagram showing details of the preset counters used in the arrangement of FIG. 5.
Figures 6A, 6B:
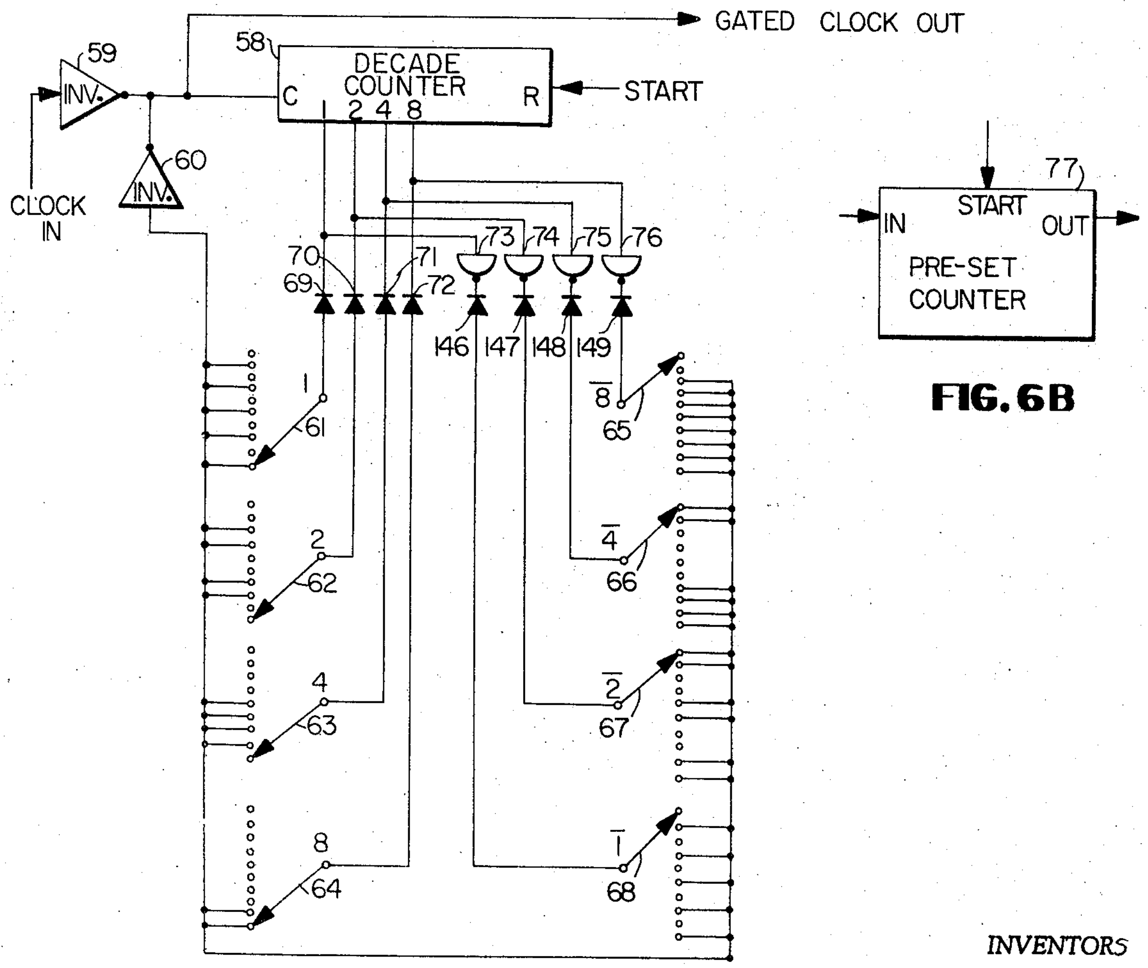
FIG. 6A is a combined logic diagram and schematic showing in detail the elements of FIG. 6, with emphasis on the switching matrix of the minterm selecter.
FIG. 6B is a symbolic logic block used as a convenience in representing the preset counter circuitry of FIG. 6A.

Logic circuitry of the preset counter, typically 39, is shown in greater detail in FIGS. 6, 6A and 6B. The basic element of the preset counter circuit is unidirectional four-bit counter 54. Pulses from clock 55 are received by unidirectional counter 54 via control NAND gate 57 which is enabled by the logical output from minterm selector 56 which selector in a decimal to BCD coding arrangement. In other words, minterm selector 56 operates as a recognition circuit, in accordance with preset switch conditions, to disable the input control NAND gate 57 after the preselected number of pulses have been counted.

Functioning of the preset counter will be understood more clearly by reference to the schematic of FIG. 6A wherein there is shown especially the decimal to BCD switching matrix with switch sections 61, 62, 63, 64, 65, 66, 67 and 68 selecting the four-bit output from decade counter 58. The matrix formed by diodes 69, 70, 71, 72, 146, 147, 148 and 149, inverters 73, 74, 75 and 76, and switch sections 61, 62, 63, 64, 65, 66, 67, and 68 permits selection of the output count combination which allows the correct number of clock pulses to enter decade counter 58 through the input gating. The entire decimal-BCD switching matrix is available as a commercial item from such manufacturers as Digi-Iran Co., 855 South Arroyo Parkway, Pasadena, Calif.

A symbolic block for the entire preset counter circuit is shown in FIG. 6B.

Figure 7:
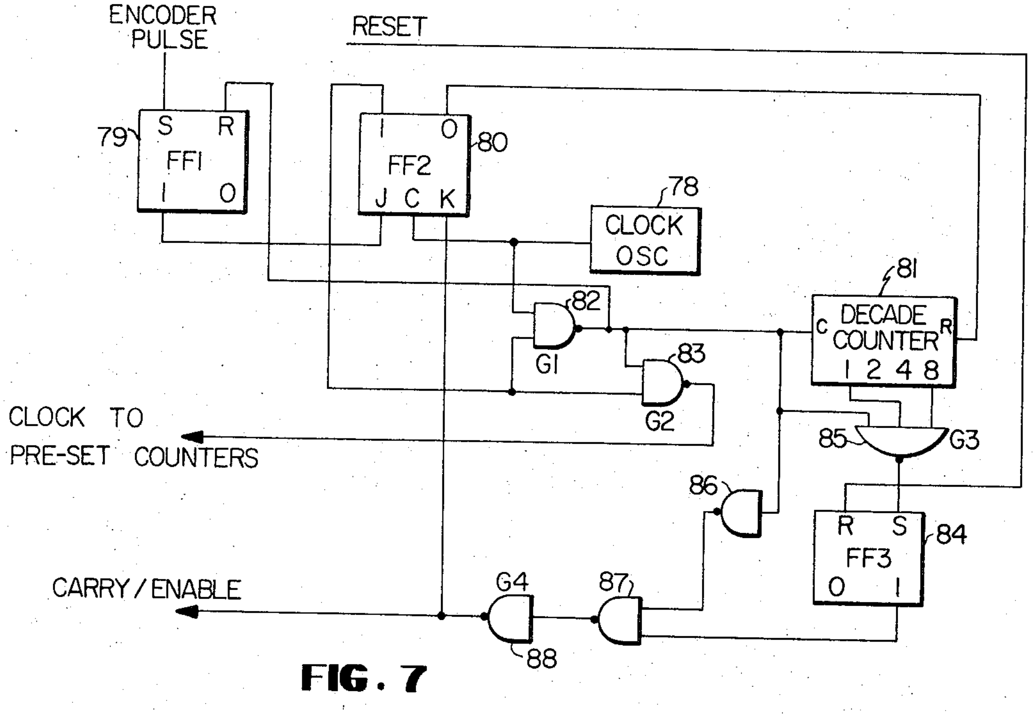
FIG. 7 is a logic diagram setting forth the detailed arrangement of the system clock.

The clock circuitry, previously illustrated in simplified form, is shown in greater detail in the logic diagram of FIG. 7. Clock oscillator 78 furnishes square wave output at a frequency consistent with the operating speed of the associated encoders, counters etc. In a prototype system a clock frequency of 2 mHz. has been used with an encoder having a maximum transition rate equivalent to 180 kHz. Associated with clock oscillator 78 are FF1 flip-flop 79 and FF2 flip-flop 80, a decade counter 81 with output G3 NAND gate 85, and FF3 flip-flop 84. G1 NAND gate 82, G2 NAND gate 83, NAND gate 87, and inverters 86 and 88 complete the clock circuitry.

Figure 7A:
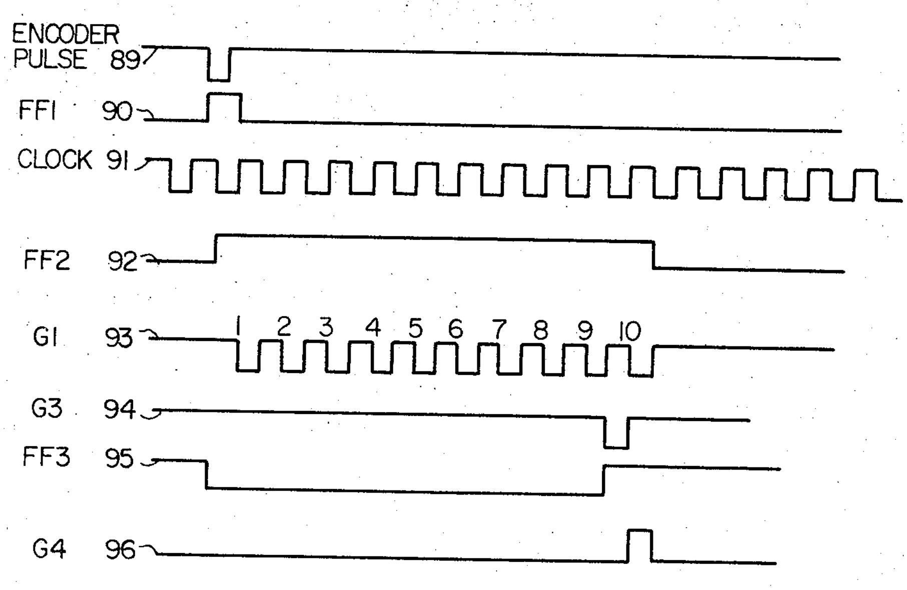
FIG. 7A is a timing diagram applying to the functioning of the system clock shown in FIG. 7.
Figure 7B:
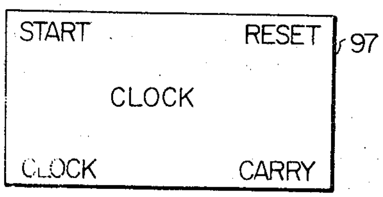
FIG. 7B is a symbolic block representing the clock circuitry of FIG. 7.

Although clock oscillator 78 runs continuously, output pulses to the preset counters and associated scaler up/down counters is blocked in the system-quiescent condition when no actuating pulses are being generated by the shaft encoder. In other words, G1 and G3 NAND gates 82 and 85 are disabled. Referring to both FIG. 7 and the timing chart of FIG. 7A, the occurrence of an encoder pulse 89 sets FF2 flip-flop 79 which in turn switches FF1 flip-flop 80 which then enables (waveform 92) G1 NAND gate 82, at the next clock pulse, so as to pass clock pulses (waveform 93) which then go through enabled G2 NAND gate 83 to the several paralleled preset counters. Decade counter 81, with its output G3 NAND gate, serves as a pulse counter or divider which delivers a deactivating pulse at the completion of nine clock pulses (waveform 94). The resulting output pulse (waveform 95) from FF3 flip-flop 84 enables NAND gate 87 so as to pass the next clock pulse as a carry-enable signal to the scaler up/down counters (FIG. 5). FF2 flip-flop 80 also is switched so as to disable G1 NAND gate 82 (waveforms 92 and 93), stopping passage of pulses from clock oscillator 78. Thus for each encoder pulse input to the overall clock circuitry, of FIG. 7, 10 clock pulses are passed to the preset counters, the carry enable pulses are generated, and the system transfers itself into a quiescent state awaiting arrival of the next encoder pulse.

Figure 8:
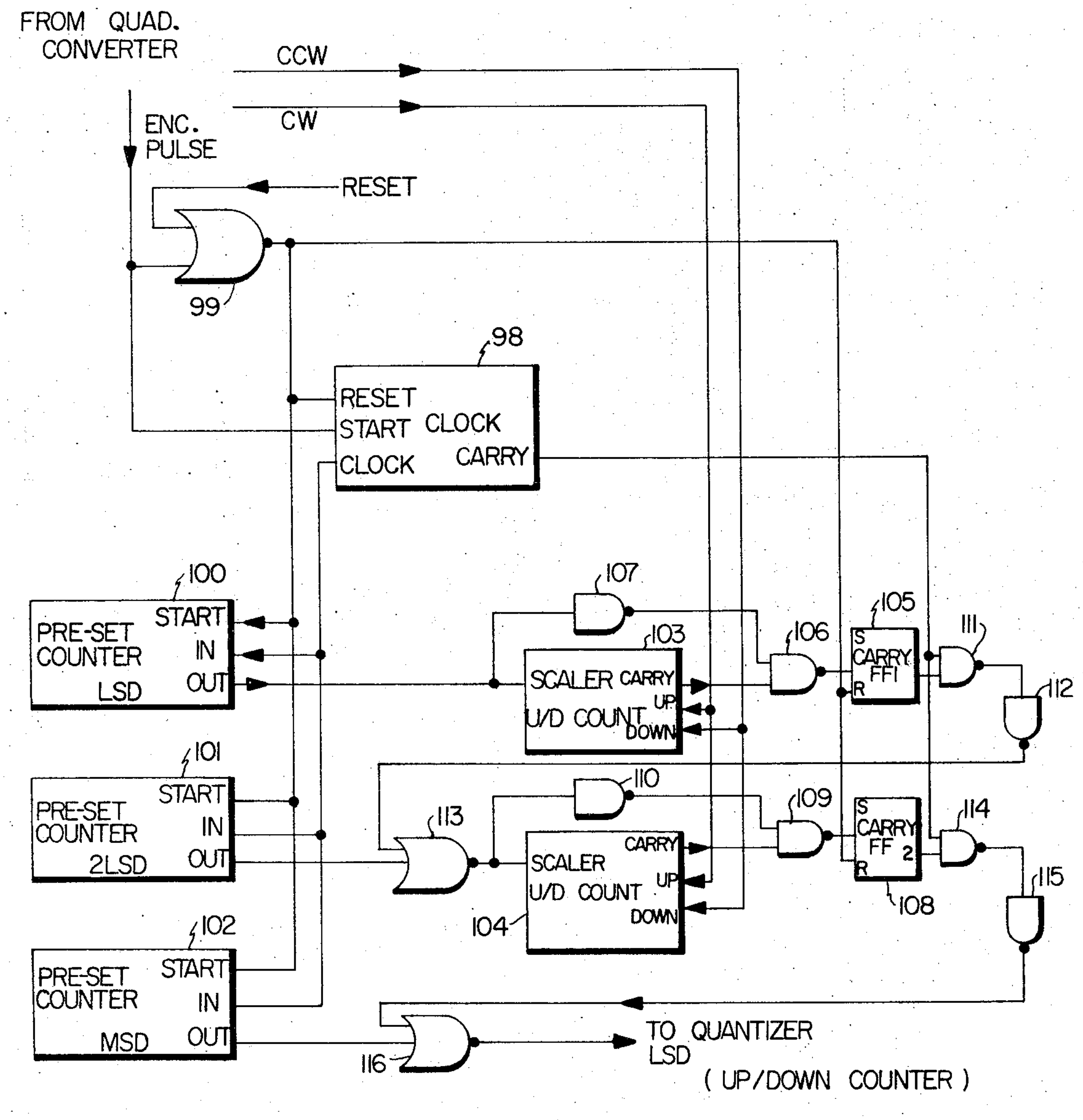
FIG. 8 is a logic diagram showing in detail the reset and carry output gating features of the scale changing apparatus of FIG. 5.

In FIG. 8 the reset arrangement for the system is included and the carry-enable gating, previously simplified, is shown in greater detail. The "reset" function is applied by way of OR gate 99 to the appropriate terminals on carry flip-flops 105 and 108 as well as the preset counters 100, 101, and 102 and clock 98. The reset line is OR'ed with the encoder pulse in OR gate 99; this logic action brings all counters to the zero count condition, where they remain until FF1 flip-flop 79 of the clock (FIG. 7) is "set" by an encoder pulse.

Figure 9:
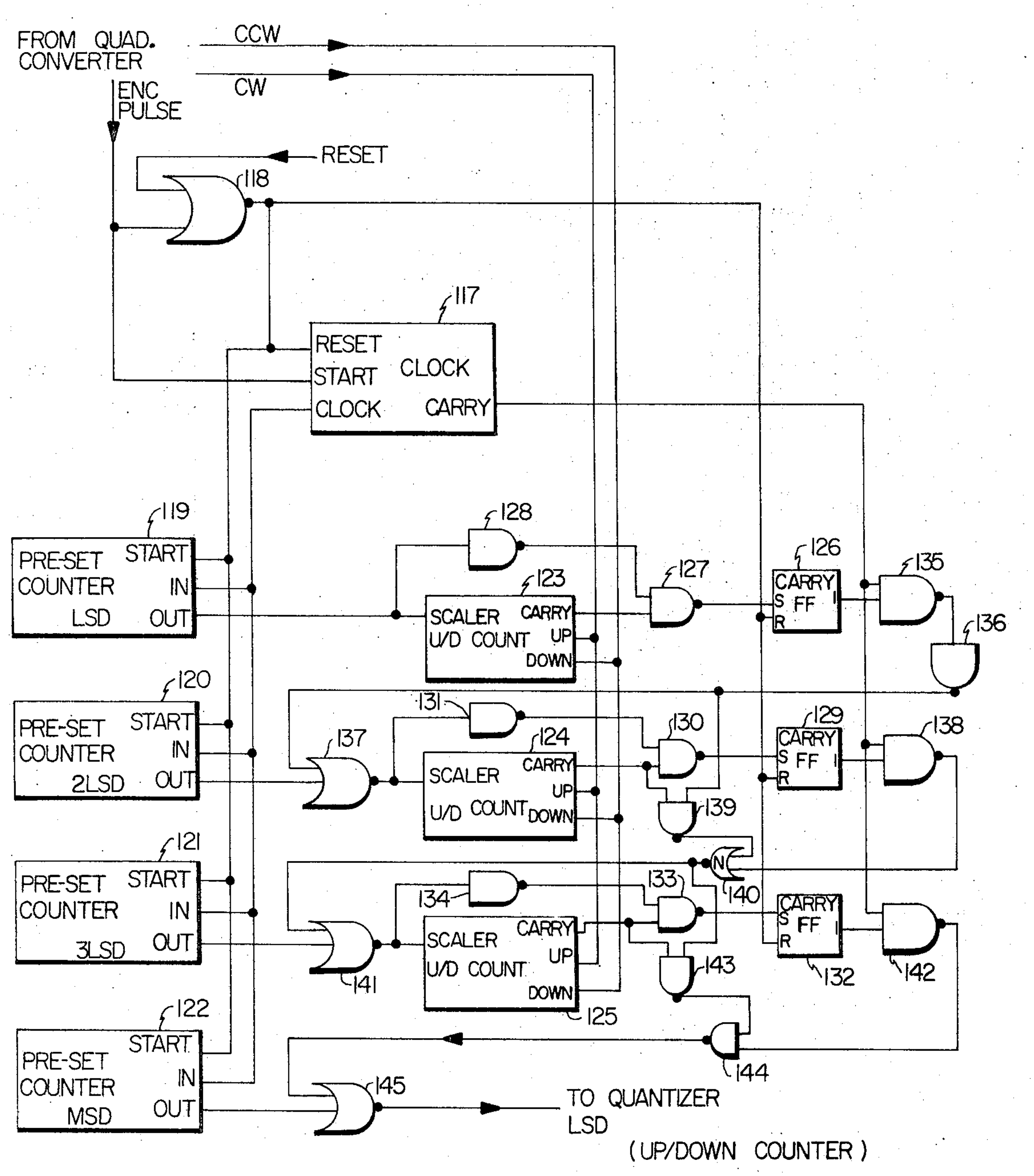
FIG. 9 is an expanded logic diagram illustrating the addition of a "look ahead" monitor feature which increases the speed of operation of the scale changing circuitry.

Although the scaler up/down counters are effectively connected in parallel that is to say, they function simultaneously from their associated preset counters the carry outputs form in series and must "ripple" through each stage of the scaler up/down counters. This passage or serial operation is time consuming and usually undesirable; higher speed operation is provided by use of a "look ahead" carry feature which is illustrated in FIG. 9. A monitor as to the output condition of the preceding scaler up/down counter is provided by on of a gate common to both counters. For example, the carry output at NOR gate 140 is dependent ON the output condition of both scaler up/down counters 123 and 124, as reflected in the output of NAND gate 139. If scaler up/down counter 123 will generate a carry output when a carry activating pulse is presented to it, the carry is passed on directly to NOR gate 140 and from there to NOR gate 141, provided the enabling NAND gate 139 is armed by the count of "9 " in scaler up/down counter 124.

We have chosen to illustrate our invention by use of NAND functions in positive logic; however, other functions such as AND, OR etc., as well as negative or even mixed logic, can be used within the scope and intent of the invention.

The digital scale-changing method and arrangement, as described above and in the drawings, especially when incorporated in the general system of the Digital Planimeter described in U.S. application Ser. No. 673,577, and preferably using the up/down counter shown in U.S. application Ser. No. 657,936, has the following advantages: 1. High counting speed; 2. Bidirectional operation, including zero crossing and sign changing; and 3. Theoretically unlimited scale coefficient range, with no loss of speed in operation.

In practical operation, as checked on prototype and production models, our invention provides high-speed processing through the use of preset counters activated in parallel and furnishing outputs to associated scaler up/down counters. In one version, described above, parallel carry "storage" also is employed to reduce the carry transit time to a minimum.

We claim:

1. Apparatus for generating a selected scale factor, comprising;
   means for generating signals representing characteristics of a physical entity,
   pulse generating means responsive to the signals for providing a clock signal having a higher frequency than the signals,
   scaling means to provide a desired scale factor to the clock signal, said scaling means including first accumulating means for receiving and storing said clock signal,
   said scaling means further including second accumulating means for receiving and storing selected portions of said clock signal and partly controlled by said first accumulating means, said second accumulating means operating bidirectionally,
   said second accumulating means providing a scaled signal output, said first accumulating means includes a plurality of counter means simultaneously responsive to the clock signal, individual ones of said counter means being responsive to a selected portion of the clock signal to represent different factors of said signals and to provide counting signals to said second accumulating means,
   each of the individual counter means includes settable recognition means for generating a feedback signal to the individual respective counter to provide said counting signals in accordance with a predetermined scale factor determined by the setting of the respective recognition means.

2. Apparatus for generating a selected scale factor, comprising;
   means for generating signals representing characteristics of a physical entity,
   pulse generating means responsive to the signals for providing a clock signal having a higher frequency than the signals,
   scaling means to provide a desired scale factor to the clock signal, said scaling means including first accumulating means for receiving and storing said clock signal,
   said scaling means further including second accumulating means for receiving and storing selected portions of said clock signal and partly controlled by said first accumulating means, said second accumulating means operating bidirectionally,
   said second accumulating means providing a scaled signal output,
   said first accumulating means includes a plurality of counter means simultaneously responsive to the clock signal, individual ones of said counter means being responsive to a selected portion of the clock signal to represent different factors of said signals and to provide counting signals to said second accumulating means,
   said counting signals are representative of the magnitude of the physical entity, and further comprising means for controlling the direction of operation of said second accumulating means,
   said second accumulating means further including a plurality of bidirectional counting means, individual ones of said bidirectional counting means being responsive to the counting signal produced from respective ones of said counter means, said second accumulating means further including means for storing a signal overflow from individual ones of said bidirectional counter means,
   and means for gating signal overflow from said means for storing to predetermined ones of said bidirectional counter means to provide said scaled signal output.

3. Apparatus according to claim 2 wherein said means for gating includes a plurality of gate circuits, individual ones of said gate circuits being responsive to individual ones of said means for storing a signal overflow to provide control signals to predetermined ones of said bidirectional counters, and logic means operatively associated with said bidirectional counter means and responsive to selected ones of said control signals to condition said bidirectional counters.

4. Apparatus according to claim 2 wherein said pulse generating means includes means for generating timing signals to control the generation of the scaled signal output and to control the operation of said gating means.

5. Apparatus according to claim 4 wherein said means for gating includes a plurality of gate circuits, individual ones of said gate circuits being responsive to individual ones of said means for storing a signal overflow to provide control signals to predetermined ones of said bidirectional counters in response to said timing signals, and logic means operation operatively associated with said bidirectional counter means and responsive to selected ones of said control signals to condition said bidirectional counters.

6. Apparatus according to claim 1 further comprising means for controlling the direction of operation of said second accumulating means, said second accumulating means further including a plurality of bidirectional counting means, individual ones of said bidirectional counting means being responsive to the counting signals produced from respective ones of said counter means, said second accumulating means further including means for storing a signal overflow from individual ones of said bidirectional counter means, and means for gating signal overflow from said means for storing to predetermined ones of said bidirectional counter means to provide said scaled signal output.

PO-1050
(5/69)

UNITED STATES PATENT OFFICE
CERTIFICATE OF CORRECTION

Patent No. 3,564,220 Dated February 16, 1971

Inventor(s) John G. Peddie and Carl F. Reuter

It is certified that error appears in the above-identified patent and that said Letters Patent are hereby corrected as shown below:

Column 2, line 74, that portion of the formula reading (xm-1) should read (xm+1).

Column 5, line 63, delet the entire line.
Column 6, line 28, delete "selector" and insert--functions--; line 44, delete "Digi-Iran" and insert--Digi-Tran--; line 66, delete "FF2" and insert--FF1--; line 67, delete "FF1" and insert--FF2--.
Column 7, line 20, after "parallel" and before "that" insert "--"; line 21, after "counters" and before "the" insert "--"; line 27, delete "on" and insert--way--; line 29, delete "ON" and insert--on--; line 36, delete ""9 "" and insert --"9"--.
Column 8, line 69, delete the word "operation".

Signed and sealed this 9th day of November 1971.

(SEAL)
Attest:

EDWARD M.FLETCHER,JR.
Attesting Officer

ROBERT GOTTSCHALK
Acting Commissioner of Pate